United States Patent
Klemets et al.

(10) Patent No.: US 7,391,717 B2
(45) Date of Patent: Jun. 24, 2008

(54) STREAMING OF VARIABLE BIT RATE MULTIMEDIA CONTENT

(75) Inventors: Anders E. Klemets, Redmond, WA (US); Rebecca C. Weiss, Menlo Park, CA (US); Jordi Ribas-Corbera, Redmond, WA (US); Philip A. Chou, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 940 days.

(21) Appl. No.: 10/611,115

(22) Filed: Jun. 30, 2003

(65) Prior Publication Data

US 2004/0264489 A1 Dec. 30, 2004

(51) Int. Cl.
*G01R 31/08* (2006.01)
(52) U.S. Cl. .................. 370/216; 370/229; 370/232; 370/233; 370/234
(58) Field of Classification Search .................. None
See application file for complete search history.

(56) References Cited

U.S. PATENT DOCUMENTS

| | | | |
|---|---|---|---|
| 4,963,995 A | 10/1990 | Lang | |
| 5,057,932 A | 10/1991 | Lang | |
| 5,132,964 A | 7/1992 | Esaki | |
| 5,164,839 A | 11/1992 | Lang | |
| 5,262,875 A | 11/1993 | Mincer et al. | |
| 5,440,334 A | 8/1995 | Walters et al. | |
| 5,568,181 A | 10/1996 | Greenwood et al. | |
| 5,710,970 A | 1/1998 | Walters et al. | |
| 5,758,076 A | 5/1998 | Wu et al. | |
| 5,787,472 A | 7/1998 | Dan et al. | |
| 5,822,537 A | 10/1998 | Katseff et al. | |
| 5,835,495 A | 11/1998 | Ferriere | |
| 5,872,920 A | 2/1999 | Hausman et al. | |
| 5,890,010 A | 3/1999 | Nishigami | |
| 5,913,038 A | 6/1999 | Griffiths | |
| 5,931,961 A | 8/1999 | Ranganathan et al. | |
| 5,963,202 A | 10/1999 | Polish | |
| 5,978,567 A | 11/1999 | Rebane et al. | |
| 5,983,263 A | 11/1999 | Rothrock et al. | |
| 5,995,705 A | 11/1999 | Lang | |
| 5,996,015 A | 11/1999 | Day et al. | |

(Continued)

FOREIGN PATENT DOCUMENTS

KR 20020069272 8/2002

OTHER PUBLICATIONS

Coulson, "A Distributed Object Platform Infrastructure for Multimedia Applications," Comptuer Communications, Jul. 1998, 27 pages, vol. 21, No. 9.

(Continued)

*Primary Examiner*—Robert W Wilson
(74) *Attorney, Agent, or Firm*—Lee & Hayes, PLLC

(57) ABSTRACT

Systems and methods for improved streaming of variable bit rate multimedia content are described. The described systems and methods solve some streaming problems by streaming the variable bit rate content at a constant bit rate that is negotiated between a server and a client. As a result, a transmission channel from server to client is utilized in an efficient manner. If the client is able to buffer the streamed content (to a hard drive, for example) the content can be streamed at a rate that is significantly less than its peak bit rate, even at a rate that is less than its average bit rate.

23 Claims, 8 Drawing Sheets

U.S. PATENT DOCUMENTS

| | | | |
|---|---|---|---|
| 6,005,621 A | 12/1999 | Linzer et al. |
| 6,014,706 A | 1/2000 | Cannon et al. |
| 6,041,345 A | 3/2000 | Levi et al. |
| 6,054,943 A | 4/2000 | Lawrence |
| 6,111,567 A | 8/2000 | Savchenko et al. |
| 6,118,817 A | 9/2000 | Wang |
| 6,120,149 A | 9/2000 | Hosoi |
| 6,161,201 A | 12/2000 | Payne et al. |
| 6,195,692 B1 | 2/2001 | Hsu |
| 6,209,041 B1 | 3/2001 | Shaw et al. |
| 6,216,163 B1 | 4/2001 | Bharali et al. |
| 6,262,990 B1 | 7/2001 | Ejiri |
| 6,272,148 B1 | 8/2001 | Takagi et al. |
| 6,292,834 B1 | 9/2001 | Ravi et al. |
| 6,292,880 B1 | 9/2001 | Mattis et al. |
| 6,314,492 B1 | 11/2001 | Allen et al. |
| 6,327,421 B1 | 12/2001 | Tiwari et al. |
| 6,329,165 B1 | 12/2001 | Chattoraj et al. |
| 6,343,298 B1 | 1/2002 | Savchenko et al. |
| 6,351,767 B1 | 2/2002 | Batchelder et al. |
| 6,385,647 B1 | 5/2002 | Willis et al. |
| 6,405,256 B1 | 6/2002 | Lin et al. |
| 6,407,680 B1 | 6/2002 | Lai et al. |
| 6,421,348 B1 | 7/2002 | Gaudet et al. |
| 6,449,269 B1 | 9/2002 | Edholm |
| 6,480,498 B1 | 11/2002 | Gaudet et al. |
| 6,484,199 B2 | 11/2002 | Eyal |
| 6,493,748 B1 | 12/2002 | Nakayama et al. |
| 6,502,135 B1 | 12/2002 | Munger et al. |
| 6,553,376 B1 | 4/2003 | Lewis et al. |
| 6,611,868 B1 | 8/2003 | Arutyunov |
| 6,611,898 B1 | 8/2003 | Slattery et al. |
| 6,614,763 B1 | 9/2003 | Kikuchi et al. |
| 6,643,259 B1 | 11/2003 | Borella et al. |
| 6,725,333 B1 | 4/2004 | Degenaro et al. |
| 6,735,634 B1 | 5/2004 | Geagan, III et al. |
| 6,757,255 B1 | 6/2004 | Aoki et al. |
| 6,760,749 B1 | 7/2004 | Dunlap et al. |
| 6,760,765 B1 | 7/2004 | Asai et al. |
| 6,765,878 B1 | 7/2004 | Carlson |
| 6,772,375 B1 | 8/2004 | Banga |
| 6,779,043 B1 | 8/2004 | Crinion |
| 6,785,288 B1 | 8/2004 | Enns et al. |
| 6,952,424 B1 | 10/2005 | Bass et al. |
| 6,954,430 B2 | 10/2005 | Haglund |
| 6,986,018 B2 | 1/2006 | O'Rourke et al. |
| 6,990,070 B1 | 1/2006 | Aweya et al. |
| 7,007,090 B1 | 2/2006 | Spangler et al. |
| 7,020,087 B2 | 3/2006 | Steinberg et al. |
| 7,051,110 B2 | 5/2006 | Hagai et al. |
| 7,054,774 B2 | 5/2006 | Batterberry et al. |
| 7,054,911 B1 | 5/2006 | Lango et al. |
| 7,054,949 B2 | 5/2006 | Jennings |
| RE39,184 E | 7/2006 | Schloss et al. |
| 7,073,028 B2 | 7/2006 | Lango et al. |
| 7,076,560 B1 | 7/2006 | Lango et al. |
| 7,133,881 B2 | 11/2006 | Sirivara et al. |
| 2002/0047899 A1 | 4/2002 | Son et al. |
| 2002/0048448 A1 | 4/2002 | Daniels |
| 2002/0049817 A1 | 4/2002 | Drory et al. |
| 2002/0077900 A1 | 6/2002 | Thompson et al. |
| 2002/0090027 A1 | 7/2002 | Karczewicz et al. |
| 2002/0138641 A1 | 9/2002 | Taylor et al. |
| 2002/0170067 A1 | 11/2002 | Norstrom et al. |
| 2002/0194608 A1 | 12/2002 | Goldhor |
| 2003/0018799 A1 | 1/2003 | Eyal |
| 2003/0099364 A1 | 5/2003 | Thompson et al. |
| 2003/0236902 A1 | 12/2003 | Weiss et al. |
| 2003/0236912 A1 | 12/2003 | Klemets et al. |
| 2004/0003101 A1 | 1/2004 | Roth et al. |
| 2004/0054912 A1 | 3/2004 | Adent et al. |
| 2004/0244010 A1 | 12/2004 | Kleyman et al. |
| 2005/0152400 A1* | 7/2005 | Suzuki ............ 370/474 |
| 2005/0157714 A1* | 7/2005 | Shlissel et al. ........ 370/389 |
| 2005/0256941 A1 | 11/2005 | Armstrong et al. |

OTHER PUBLICATIONS

Gunningbert et al. "How a large ATM MTU causes deadlocks in TCP data transfers" IEEE/ACM Transactions on Networking vol. 3 Issue 4 Aug. 1995 pp. 409-422.

Nagle, "Congestion Control in IP/TCP Internetworks," RFC 896, Jan. 6, 1984, 8 pages.

Stevens, "TCP Slow Start, Congestion Avoidance, Fast Retransmit, and Fast Recovery Algorithms," RFC, Jan. 1997, 6 pages.

"TCP Protocol Overview," From the Internet: http://www.freesoft.org/CIE/Topics/83.htm, Connected: An Internet Encyclopedia, retrieved on May 31, 2000.

"Transmission Control Protocol," From the Internet: http:/www.scit.wlv.ac.uk/~jphb/comms/tcp.html, retrieved on May 31, 2000.

Guo, Katherine, et al. "RCache: Design and Analysis of Scalable, Fault Tolerant Multimedia Stream Caching Schemes," Scalability and Traffic Control in IP Networks, Proceedings of SPIE vol. 4526, (2001); pp. 68-86.

Aboobaker, N., et al., "Streaming Media Congestion Control Using Bandwidth Estimation," Lecture Notes in Computer Science, 2002, vol. 2496, pp. 89-100.

Liefooghe, P., et al., "An Architecture for Seamless Access to Multicast Content," Proceedings of the 26th Annual IEEE Conference on Local Computer Networks, Nov. 8, 2000, pp. 488-494.

Braun, T., et al., "Multicast for Small Conferences," Proceedings of the Sixth IEEE Symposium on Computers and Communications, Jul. 3, 2001, pp. 145-150.

Fleischman, E., "WAVE and AVI Codec Registries," Network Working Group Request for Comments: 2361, The Internet Society, Jun. 1998, pp. 1-71.

Camarillo, G., et al., "Grouping of Media Lines in the Session Description Protocol (SDP)," Network Working Group Request for Comments: 3388, The Internet Society, Dec. 2002, pp. 1-21.

Handley, M., et al., "SDP: Session Description Protocol," Network Working Group Request for Comments: 2327, The Internet Society, Apr. 1998, pp. 1-42.

"Advanced Systems Format (ASF) Specification," Revision 01.20.01e, Microsoft Corp., Sep. 2003, pp. i-vi and 1-93.

Schulzrinne, H., et al., "RTP: A Transport Protocol for Real-Time Applications," Network Working Group Request for Comments: 3550, Jul. 2003, pp. 1-104.

Muuss, M., "The Story of the PING Program," Oct. 18, 1999, retrieved on Apr. 6, 2004 from the Internet Archive at <http://web.archive.org/web/19991018225218/ftp.arl.mit/~mike/ping.htm>, 3 pages.

Muuss, M., "The Research Interests of Mike Muuss," Oct. 8, 1999, retrieved on Apr. 6, 2004 from the Internet Archive at <http://web.archive.org/web/19991008020453/ftp.an.mil/~mike/>, 2 pages.

Fielding R. et al, "Hypertext Transfer Protocol—HTTP/1.1," Network Working Group Request for Comments: 2616, The Internet Society (Jun. 1999); Category: Standards Track. pp. 1-176.

Schulzrinne, H., et al., "Real Time Streaming Protocol (RTSP)," Network Working Group Request for Comments: 2326; The Internet Society (Apr. 1998). pp. 1-92.

Jin, S., et al. "Accelerating Internet Streaming Media Delivery using Network-Aware Partial Caching," 2002 IEEE, pp. 153-160.

Kamiyama N et al. "Renegotiated CBR transmission in interactive video-on-demand system", Multimedia Computing and Systems '97 Proceedings, IEEE International Conference, Ottawa ONT, Canada Jun. 3-6, 1997 pp. 12-19.

Petit G H et al. "Bandwidth resource optimization in ivdeo-on-demand network architectures", Community Networkign Integrated Multimedia Services to the Home, 1994, Proceedings of the 1st International Workshop on San Francisco, CA Jul. 13-14.

Dutta A et al. "A Streaming architecture for next generation internet", ICC 2001, 2001 IEEE International Conference on Communications. Helsinky, Finland, Jun. 11-14, 2001, 1303-1309.

Lixin Gao et al. "Supplying instantaneous video-on-demand services using controlled multicast", Multimedia Computing and Systems, 1999, IEEE International Conference on Florence, Italy Jun. 7, 11, 1999, pp. 117-121.

Hayes D A et al; "Impact of Flow Control on quality of service driven packet scheduling disciplines"; Control Applications, 1999. Proceedings of the 1999 IEEE International Conference onControl Applications; Kohala Coast, HI, Aug. 22, 1999; pp. 1454-1459.

Nishida Y et al; "Congestion Control Mechanism for TCP with Packet Pair Scheme"; IEICE Transactions on Information and Systems, Institute of Electronics Information and Comm. Egn. Tokyo, JP, vol. E82-D, No. 4, Apr. 1999 pp. 854-862.

Lai K et al; "Measuring bandwidth" INFOCOM '99; Eighteenth Annual Joint Conference of the IEEE Computer and Communications Societies Proceedings; IEEE New York, NY, USA Mar. 21-25, 1999; Mar. 21, 1999, pp. 235-245.

Minshall G et al; "Application performance pitfalls and TCP's Nagle algorithm"; vol. 27, No. 4, pp. 36-44, XP002233094 Performance Evaluation Review, Mar. 2000.

"Performance Considerations for TCP/IP in Wide Area Networks", Khalil et al., IEEE 1994, pp. 166-175.

"How a Large ATM MTU Causes Deadlocks in TCP Data Transfers", Moldeklev et al., IEEE/ACM Transactions on Networking, vol. 3, No. 4, Aug. 1995, pp. 409-422.

"A Mathematical Theory of Communication", Shanon, C.E., The Bell System Technical Journal, vol. 27, pp. 379-423, 623-656, (pgs renumbered as 1-55), Jul., Oct. 1948.

"TAPI 3.0 Connection and Media Services", Microsoft Windows 2000 Server, Copyright 1999, pp. 1-23.

Microsoft Computer Dictionary 5th Edition, May 1, 2002, p. 428.

Paknikar, Shantanu, et al., "A Caching and Streaming Framework for Multimedia," ACM Multimedia 2000, Los Angeles, CA, copyright 2000, pp. 13-20.

\* cited by examiner

ENCODER
METHODOLOGICAL
IMPLEMENTATION
300

SERVER METHODOLOGICAL
IMPLEMENTATION
300

CLIENT METHODOLOGICAL
IMPLEMENTATION
500

CALCULATE BTOT'
600

CALCULATE BTOT
& BUFFER SIZE
620

STREAMING OF VARIABLE BIT RATE MULTIMEDIA CONTENT

TECHNICAL FIELD

The systems and methods described herein relate to streaming variable bit rate multimedia content. More particularly, the systems and methods described herein relate to streaming variable bit rate multimedia content at a constant bit rate negotiated between a server and a client.

BACKGROUND

Traditional approaches to multimedia streaming provide content that is encoded at a constant bit rate and transmitted from a server to one or more clients over a constant bit rate channel. For example, standard telephone quality audio content is often encoded at 64K bits per second (b/s). Therefore, a telephone transmission channel must have a throughput of at least 64K b/s to properly stream the audio content.

In contrast, it is sometimes more advantageous to encode video content using a variable bit rate, the reason being that for certain types of video content—such as movies—the information that needs to be encoded varies over time. An idle segment of a movie contains less information than a segment where there is a great deal of action. It may be inefficient to encode such content at a constant bit rate. Depending on the bit rate chosen, idle segments can under-utilize an available bit rate, while action segments may not have sufficient bit rate to be encoded with the same quality as the idle segments.

Encoding a movie at a bit rate that varies as necessary to obtain the desired quality allows the movie to be encoded at a constant quality. However, variable bit rate content can pose problems for streaming media applications. One of the main problems is that the throughput of the transmission channel is often limited. If the instantaneous bit rate of the encoded content is ever higher than the throughput of the channel, the content cannot be streamed, even if the average bit rate of the content is less than the channel's throughput.

Another problem encountered is that transmission channels sometimes require that a constant bit rate be reserved for the streaming content application. In such cases, the channel will not be utilized efficiently. To stream the content, the reserved bit rate must be at least as large as the peak bit rate of the content. That means that during periods when the bit rate of the content does not fully reach the peak, a portion of the reserved bit rate is not being utilized, and that too much bandwidth was reserved in the first place.

SUMMARY

The systems and methods described herein provide for improved streaming of variable bit rate multimedia content. The described systems and methods solve the problems cited above by streaming the variable bit rate content at a constant bit rate that is negotiated between a server and a client. As a result, the content is streamed at a constant bit rate so the transmission channel is utilized in an efficient manner, solving the second problem mentioned above. If the client is able to buffer the streamed content (to a hard drive, for example) the content can be streamed at a rate that is significantly less than its peak bit rate. The content can even be streamed at a rate that is less than its average bit rate, which solves the first problem mentioned above.

The systems and methods described herein also provide for techniques to reduce the size of a client buffer utilized in the streaming process. Reducing the size of the client buffer also reduces a startup delay (streaming rate multiplied by the buffer size) experienced in the streaming process. These techniques solve two additional problems traditionally encountered in streaming multimedia content, namely, a large buffer size and a long startup delay.

BRIEF DESCRIPTION OF THE DRAWINGS

The same numbers are used throughout the drawings to reference like features and components.

DETAILED DESCRIPTION

Systems and methods for improved streaming of variable bit rate multimedia content are described herein. One or more exemplary implementations of systems and methods for streaming of variable bit rate multimedia content are shown. The described systems and methods are exemplary only and are not meant to limit the scope of the appended claims. Other embodiments not specifically described herein may be implemented within the scope of the appended claims.

The implementations of systems and methods for streaming variable bit rate multimedia content are shown embodied in one or more of three components: a server, an encoder and a client. It is noted that the encoder may be embodied separate from the server; although a typical embodiment of a server including an encoder is shown.

Advanced System Format (ASF)

The exemplary implementations shown herein utilize the Advanced System Format (ASF) for storing coordinated multimedia data for its ability to deliver data over a wide variety of networks and for its additional suitability for local playback. However, it is noted that another format may be used without departing from the scope of the appended claims. Those skilled in the art will recognize any variations in the described implementations that may be necessary to adapt the implementations to utilize another file format.

An ASF file is composed of one or more media streams. A file header specifies properties of an entire file, along with stream-specific properties. Multimedia data, stored after the file header, references a particular media stream number to indicate its type and purpose. The delivery and presentation of all media stream data is aligned to a common timeline.

ASF is a multimedia presentation file format. It supports live and on-demand multimedia content. ASF files may be edited, but ASF is specifically designed for streaming and/or local playback.

ASF files are logically composed of three types of top-level objects: a header object, a data object and an index object. The header object is mandatory and must be placed at the beginning of every ASF file. The data object is also mandatory and must follow the header object. The index object (or objects) is/are optional but are useful in providing time-based random access into ASF files.

The following descriptions will focus on a file header object and file data objects and may be referred to simply as a header and one or more data packets. Although shown in one or more simplified diagrams, below, the header object and file data objects shown comport with ASF specifications © 2001-2003 MICROSOFT CORP.

Exemplary Server/Encoder System

Figure 1:
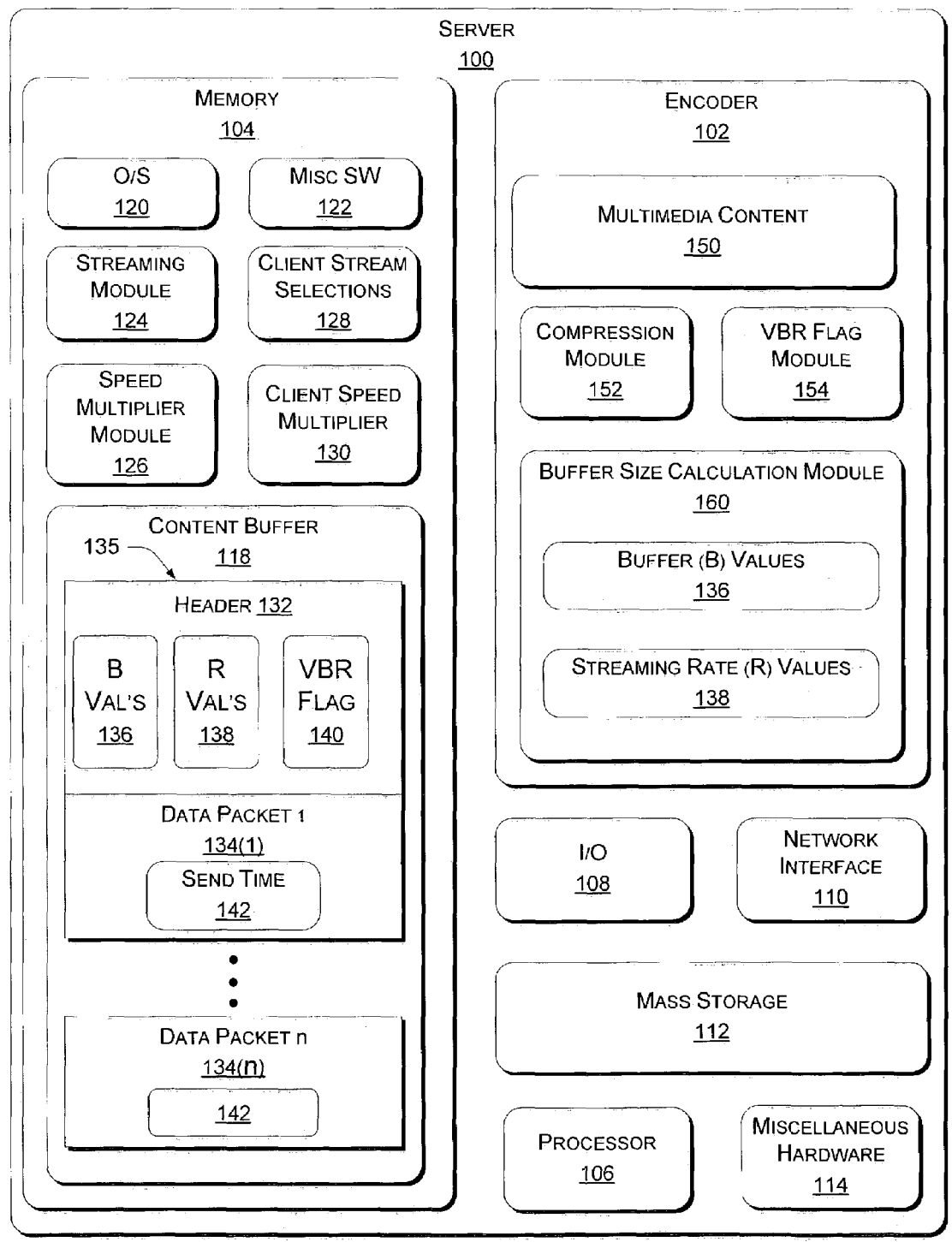
FIG. 1 is a block diagram of an exemplary server and encoder in accordance with the systems and methods described herein.

FIG. 1 is a block diagram depicting an exemplary server 100 that includes a multimedia content encoder 102 and memory 104. The server 100 also includes a processor 106, an input/output (I/O) module 108 and a network interface 110 through which the server 100 communicates with one or more client computers over a network.

The I/O module 108 may be any one or more modules that provide data to the server or assist in the transmission of data from the server 100, including but not limited to a parallel port, a serial port, a USB (Universal Serial Bus) port, an infrared (IR) port, a user input device or the like. The network interface 110 typically comprises a network interface card but may also comprise a modem, a wireless network interface device, or the like.

The server 100 also includes a mass storage device 112 such as a hard disk drive, an optical drive or the like, that may be used to store one or more applications, buffer content, etc. Additionally, the server 100 includes other miscellaneous hardware 114 that is typically found on a server and may be required to cooperate with other elements of the server described below to provide the functionality described herein.

The encoder 102 and the memory 104 are shown as having several elements therein. It is noted that these elements may be integrated within the server 100 elements or in a separate encoder embodiment. The elements shown in the encoder 102 and the memory 104 may comprise hardware modules, software modules and/or data or a combination of hardware and software. Furthermore, the elements and functionality attributed to the server memory 104 and the encoder 102, respectively, may be distributed among the server 100, the encoder 102 and the memory 104 in any other fashion that provides similar functionality as described below.

As shown in the present example, the memory stores an operating system 120 that controls the functionality and coordination thereof for the server 100 and its elements. The memory 104 also stores miscellaneous software 122 that may include application programs, control programs or the like that may be necessary in addition to the specific modules discussed below to carry out one or more of the functions described herein.

The memory 104 also stores a streaming module 124 and a speed multiplier module 126 that are configured to stream content to one or more client computers. A client stream selection 128 and stores a selection of streams selection from a client for transmission to the client and a client stream multiplier 130 which stores a speed multiplier requested by a client for streaming and an actual speed multiplier utilized by the server 100 for streaming content to the client. The client stream selection 128 and the client speed multiplier 130 will be discussed in greater detail below.

A header 132 is stored in a content buffer 118 of the memory 104 and is associated with a series of data packets (data packet 1 134(1) through data packet n 134(n)). The header 132 stores multiple buffer (B) values 136, multiple streaming rate (R) values 138, and a variable bit rate flag 140 that, when set, indicates that the data packets 134 include variable bit rate data.

Each data packet 134 includes a send time 142 that is used to identify a time at which the server 100 is to transmit each respective data packet to a client. The send time 142 is utilized to cause variable bit rate content to be streamed at a variable bit rate to the client. However, if the client requests that the content should be streamed at a non-real-time rate and the data packets 134 contain variable bit rate content, then the server 100 will ignore the send times 142 and stream the content at a constant bit rate. This function is described in greater detail below.

As shown in the present example, the encoder 102 includes multimedia content 150 that may be stored in memory or streamed in to the encoder 102 from an outside source. A compression module 152 encodes the multimedia content 150 to store in the memory 102 as the series of data packets 134. The header 132 and the data packets 134 shown stored in the memory 104 comprise a data file 135.

A variable bit rate (VBR) flag module 154 sets the VBR flag 140 in the header 132 if the multimedia content is variable bit rate content and the client hasn't requested a constant bit rate, as previously discussed.

The encoder 102 also includes a buffer size calculation module 160 that is configured to calculate how much data a client needs to buffer to stream content at a given rate as the encoder 102 compresses the multimedia content 150. The buffer calculation module 160 uses a "leaky bucket" model that takes into account the multiple buffer (B) values 136 and the multiple rate (R) values 138.

The "leaky bucket" model is an allegorical reference to variable bit rate data flowing into a figurative "bucket" that may be represented as one or more values in the content buffer 118. There is a hole in the bucket, and data flows out through the hole at a constant bit rate (R). At moments when R is less than the instantaneous bit rate, data will accumulate in the bucket. The bucket can only hold a certain amount of data, B, before it overflows. Initially, the bucket is empty, at least in the implementations described herein. It is noted, however, that one or more other implementations may start with an initial buffer fullness of a nonzero value.

In at least one implementation described herein, the encoder 102 chooses fourteen (14) different streaming rates (R values 136) and calculates the smallest value of buffer size, B values 138, for each R such that the bucket does not overflow. The encoder stores the fourteen values for R and B in the header 132 (R values 138 and B values 136).

Additionally, the encoder 102 calculates a pair of R and B values for each stream of the multimedia content 150 (included in buffer values 138 and streaming rate values 136). For example, two R and B values for the audio stream and two R and B values for the video stream. One of these R values is referred to herein as the average bit rate of the stream (Ravg(n)) and the other value is referred to herein as the peak bit rate of the stream (Rpeak(n)). The bit rates correspond to an average buffer size for the stream (Bavg(n)) and the peak buffer size for the stream (Bpeak(n)). It is noted, however, that in practice these values may not exactly correspond to true average and peak bit rates. Furthermore, it is noted that it is not necessarily true that the average rates and buffer sizes are always smaller than the peak rates and buffer sizes.

It is also noted that more than two rate/buffer size pairs may be used for each stream. For example, one particular implementation may utilize four rate values and four corresponding buffer size values. Those skilled in the art will readily understand how the use of more than two rate/buffer size pairs can be integrated into the description provided herein.

The elements of the server 100 and the functionality thereof will be discussed in greater detail, below, with respect to explanation of one or more methodological implementations in which said elements are involved.

Exemplary Client System

Figure 2:
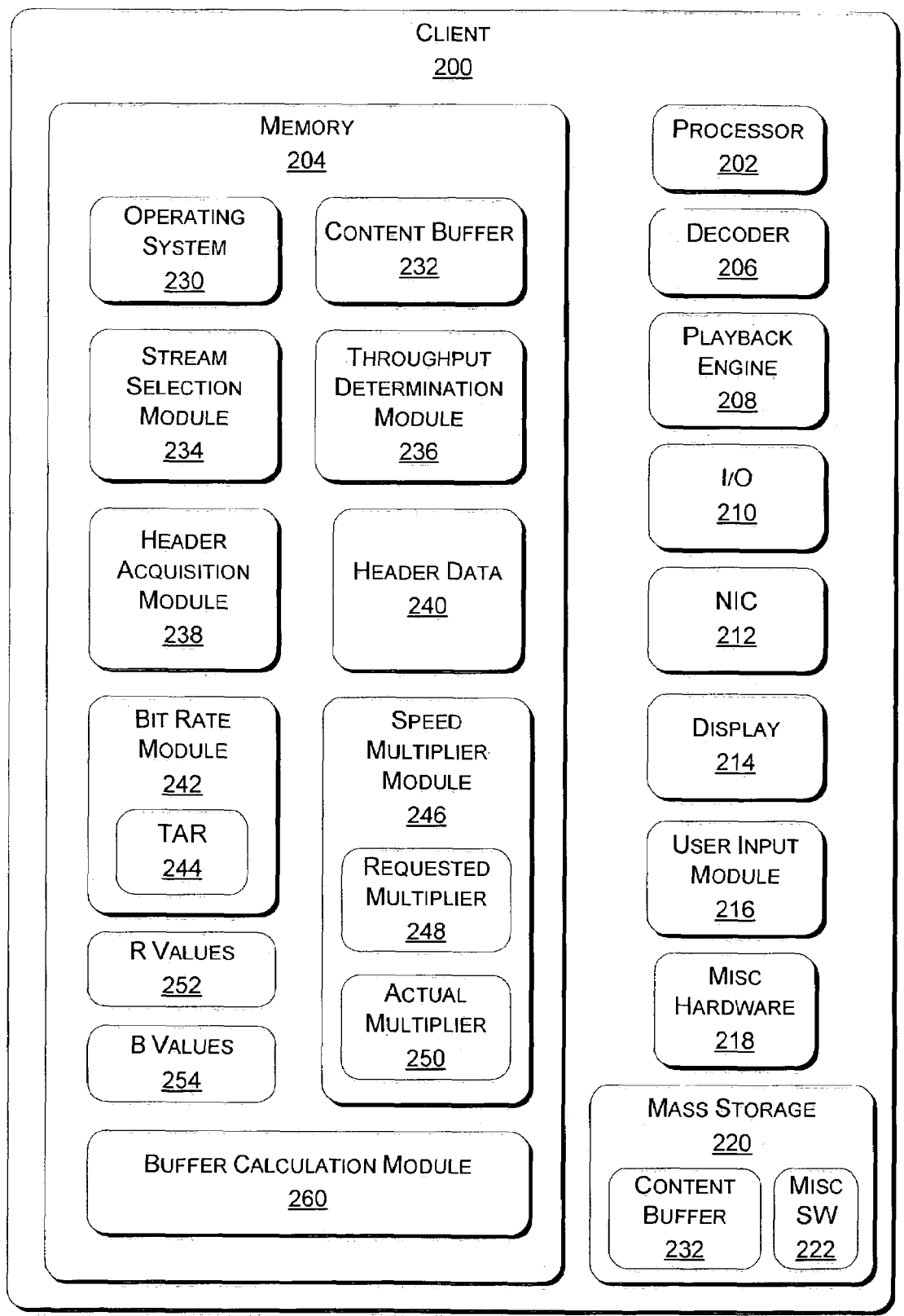
FIG. 2 is a block diagram of an exemplary client in accordance with the systems and methods described herein.

FIG. 2 is a block diagram of an exemplary client 200 in accordance with the systems and methods for improved streaming of variable bit rate multimedia content described herein. The client 200 includes a processor 202, memory 204, a decoder 206 and a playback engine 208. The decoder 206 is configured to decode and/or decompress multimedia content encoded and streamed to the client 200 from a server (e.g. server 100, FIG. 1). The playback engine 208 is configured to render the multimedia content on the client 200.

The client 200 also includes one or more input/output (I/O) modules 210 through which data is transmitted into and out of the client 200. The I/O module(s) 210 can include but is not limited to a port (parallel, USB, serial, IR), a speaker connection, or the like. The client 200 also includes a network interface card (NIC) 212 that the client 200 uses to communicate with one or more other systems across a network, such as the Internet (not shown). Although the NIC 212 is shown, it is noted that other means of network communication may be used in place of the NIC 212, such as a modem or other device.

The client 200 also includes a display 214 on which the multimedia content (video) may be rendered, a user input module 216 that may include a keyboard, mouse, stylus, etc., and other miscellaneous hardware 218 that may be necessary to accomplish functionally peripheral tasks associated with the techniques described herein.

A mass storage device 220 is included in the client 200 and is used to store electronic data, such as application software and other miscellaneous software that may be used to implement the systems and methods described herein.

The memory 204 stores an operating system 230 and has a content buffer 232. The content buffer 232 is also depicted as being stored on the mass storage device 220 as it may be stored in any available memory of a sufficient size. Also stored in the memory 204 is a stream selection module 234 that is configured to select one or more streams from multimedia content received from a server. A throughput determination module 236 stored in the memory 204 is configured to determine throughput for a channel with another system, such as a server.

The client 200 uses the channel throughput to determine which streams it wants to receive. If the same content has been encoded in multiple bit rates, the channel throughput will influence which streams the client selects. However, it is noted that the client 200 will typically select at least one audio stream and one video stream even if the channel throughput is not enough to stream the streams in real time.

A header acquisition module 238 is configured to retrieve header data 240 from a header associated with a stream from a server or other system that the client 200 can use to more efficiently determine streaming parameters. In one implementation, only certain information from the header is obtained while in another implementation, the entire header may be acquired.

A bit rate module 242 is configured to calculate a sum of an average bit rate of each selected stream, i.e. a total average bit rate (TAR 244). A speed multiplier module 246 calculates a requested speed multiplier 248 from channel throughput and the total average bit rate 244 to determine a speed to request from a server (in at least one implementation, this is done in a "Speed" header of a "Play" command).

An actual speed multiplier 250 is stored in the memory 204 and represents a speed multiplier contained in a server's response to a "Play" request (typically in a "Speed" header). This accounts for occasions in which a server may limit the speed multiplier to a lower value than what the client 200 requested.

The bit rate module 242 is also configured to calculate a streaming bit rate, which is included in streaming rate (R) values 252 stored in the memory 204. The memory 204 also stores buffer (B) values 254 that are used (as described below) in the calculation of the size of the content buffer 232.

A buffer calculation module 260 calculates how much data the client must buffer (i.e. the size of the content buffer 232) before the client can begin to play, or render, the multimedia content. The content will arrive from a server at a constant bit rate but the playback engine 208 will consume the data at a variable bit rate. Depending on the difference between the peak and average bit rates, different amounts of content data may need to be buffered before playback can begin. If not enough data has been buffered, the playback engine 208 will run out of data and the audio and video will exhibit undesirable artifacts.

Further aspects of the elements and functions shown and described in FIGS. 1 and 2 will be discussed below, with respect to methodological implementations of the systems and methods shown and described herein.

Methodological Implementation—Encoder

Figure 3:
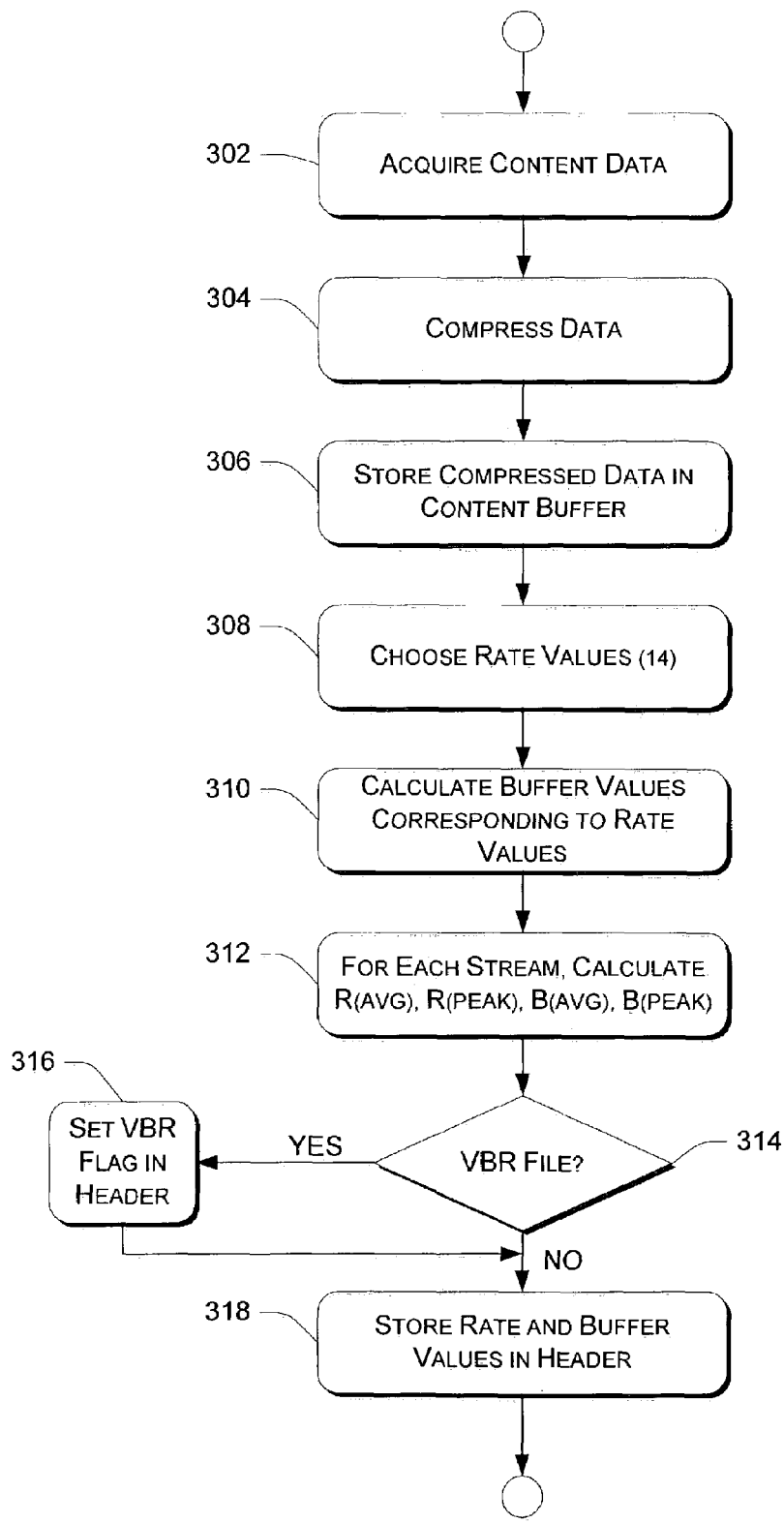
FIG. 3 is a flow diagram of an encoder methodological implementation described herein.

FIG. 3 is a flow diagram 300 depicting one exemplary methodological implementation of an encoder in accordance with the systems and methods described herein. In the following discussion, continuing reference will be made to the elements and reference numerals of FIGS. 1 and 2.

At block 302, the encoder 102 acquires multimedia data from a content file or from an outside source that transmits the content to the server 100. The encoder 102 compresses (i.e. encodes) the content at block 304 and creates the data file 135 in the content buffer 132 (block 306).

In one implementation described herein, the buffer size calculation module 160 of the encoder 102 chooses fourteen (14) different streaming rate values (R) 138 (block 308) and calculates the smallest value of buffer value (i.e. size) B 136 for each R 138 so that the "bucket" in the model utilized does not overflow at block 310.

These buffer values 136 and rate values 138 are calculated across all streams in the multimedia content 150, and they include any non-data overhead from the file. Additionally, the buffer size calculation module 160 calculates a pair of R and B values 138, 136 for each stream at block 312. Each pair of R values 138 includes an average bit rate and a peak bit rate. For example, an average bit rate and a corresponding buffer value and a peak bit rate and a corresponding buffer value are calculated for an audio stream. Likewise an average bit rate and a corresponding buffer value and a peak bit rate and a corresponding buffer value are calculated for a video stream.

If the data file 135 contains variable bit rate content ("Yes" branch, block 314), then the VBR flag module 154 of the encoder 102 sets the VBR flag 140 in the header 132 at block 316. The encoder 102 then stores the rate values 138 and buffer values 136 in the header at block 318. If the data file 135 does not contain variable bit rate content ("No" branch, block 314), then the encoder 102 stores the rate values 138 and buffer values 136 in the header at block 318.

Methodological Implementation—Server

Figure 4:
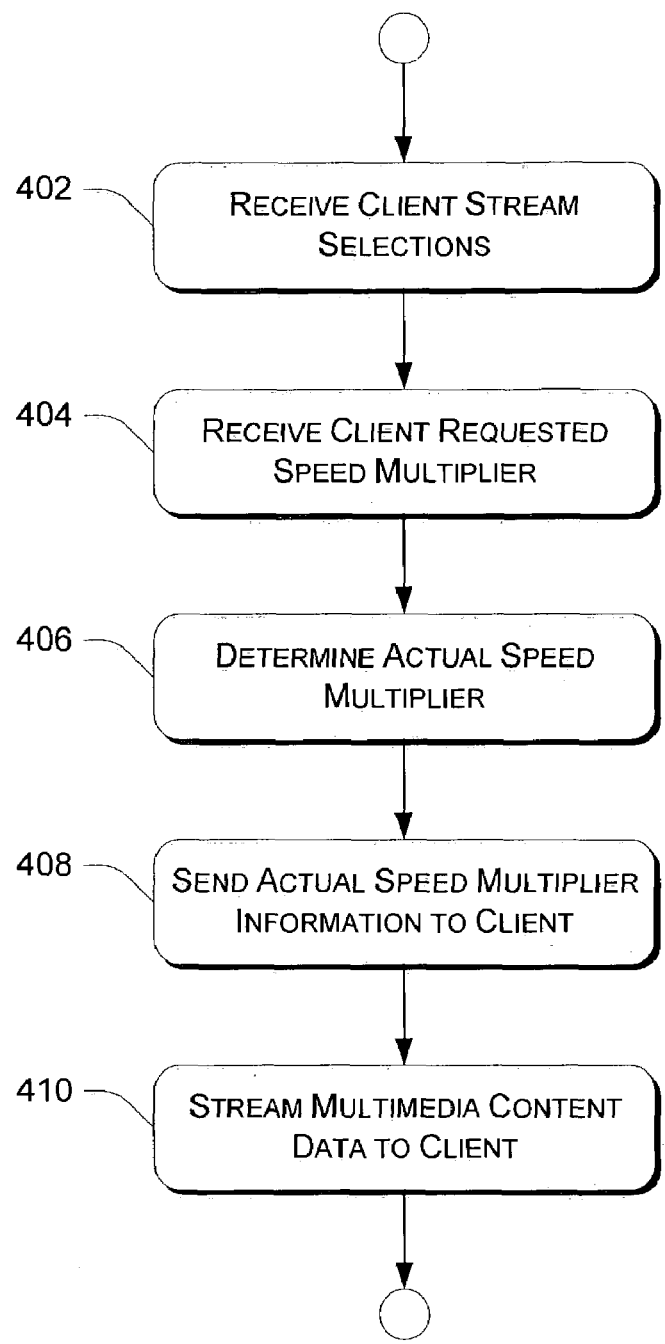
FIG. 4 is a flow diagram of a server methodological implementation described herein.

FIG. 4 is a flow diagram 400 depicting one exemplary methodological implementation of a server in accordance with the systems and methods described herein. In the following discussion, continuing reference will be made to the elements and reference numerals of FIGS. 1 and 2.

At block 402, the server 100 receives client stream selections 128 from the client 200. The client stream selections 128 are streams from the data file 135 that the client 200 has selected to receive. At block 404, the server 100 receives the client speed multiplier 130 requested by the client 200. The speed multiplier module 126 determines the actual client speed multiplier 130 that will be used in the streaming process (block 406). The client speed multiplier 130 may remain unchanged from the requested value or it may be altered to better accommodate server and client parameters.

The actual client stream multiplier 130 is then transmitted to the client 200 at block 408. After the client 200 sets up to receive the streaming data, the server 100 streams the multimedia content to the client 200 at block 410.

Methodological Implementation—Client

Figure 5:
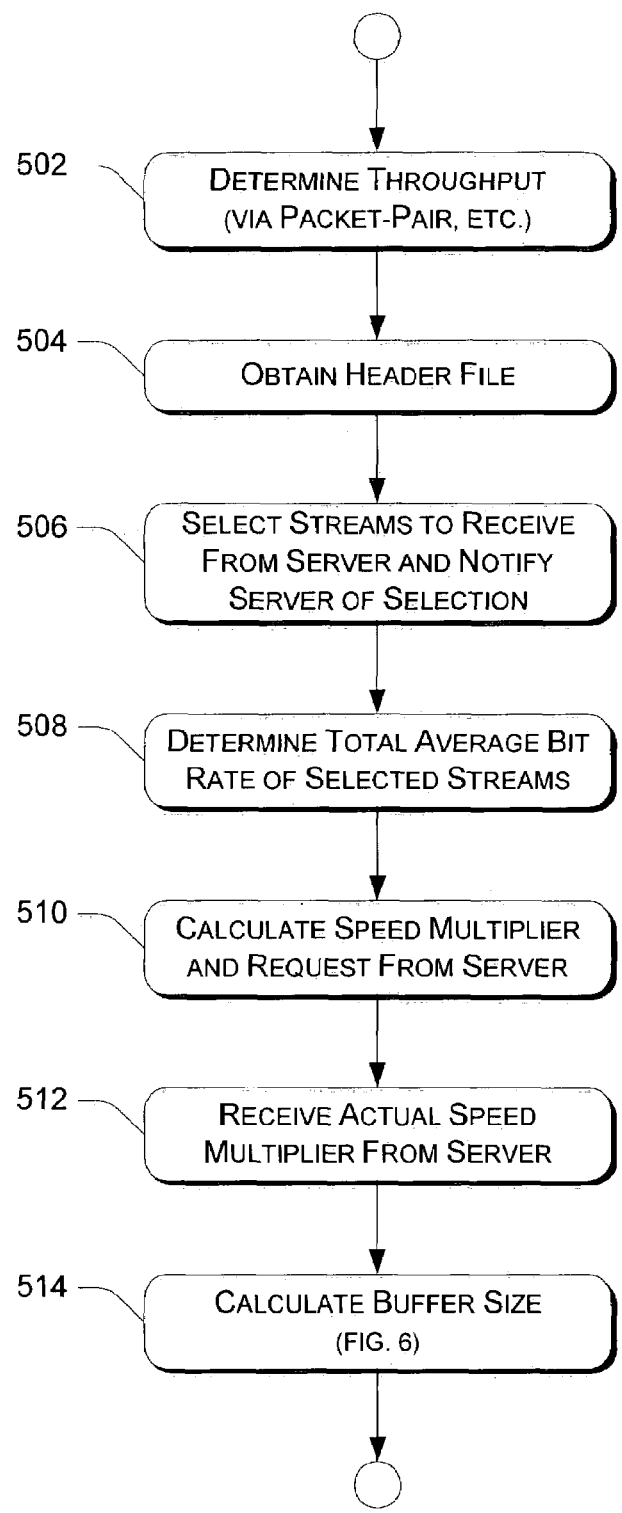
FIG. 5 is a flow diagram of a client methodological implementation described herein.

FIG. 5 is a flow diagram 500 depicting one exemplary methodological implementation of a client in accordance with the systems and methods described herein. In the following discussion, continuing reference will be made to the elements and reference numerals of FIGS. 1 and 2.

At block 502, the throughput determination module 236 of the client 200 determines the throughput of a channel established between the client 200 and the server 100. This determination may be done by any method known in the art.

At block 504, the header acquisition module 238 obtains the header data 240 from the header 132 that the client 200 will need to calculate an appropriate streaming rate and buffer size. The stream selection module 234 uses the buffer values 136 and the streaming rate values 138 retrieved from the header 132 and the channel throughput to select one or more streams for streaming (block 506) and notifying the server 100 of the stream selection(s). Although the buffer values 136 and the streaming rate value 138 are used in the selection process, it is noted that other considerations are also used in determining which streams to select for streaming (e.g. is an audio stream in English preferred over an audio stream in French? etc.).

At block 508, the bit rate module 238 derives the total average bit rate 244 of the selected streams by summing the average bit rate of each selected stream. It is noted that this bit rate is not one of the fourteen (14) bit rates selected in the "leaky bucket" method described above; this is one of the bit rate pairs chosen for each stream.

The requested speed multiplier 248 is derived from the channel throughput and the total average bit rate 244. More specifically, in the present example, the requested speed multiplier 248 is the channel throughput divided by the total average bit rate 244. If the channel throughput is insufficient to stream the content in real time, the speed multiplier will have a value that is less than one (1). Furthermore, the speed multiplier module 246 may also be configured to reduce the speed multiplier by some predetermined amount (e.g. 15%) to account for network transmission overhead.

After the requested speed multiplier 248 is sent to the server 100, the server 100 returns the actual speed multiplier 250 that will be used in the streaming process at block 512. The buffer calculation module 260 proceeds to calculate the appropriate buffer size that should be used in the streaming process at block 514. The process of block 514 is described in greater detail, below, with respect to FIG. 6.

Figure 6A:
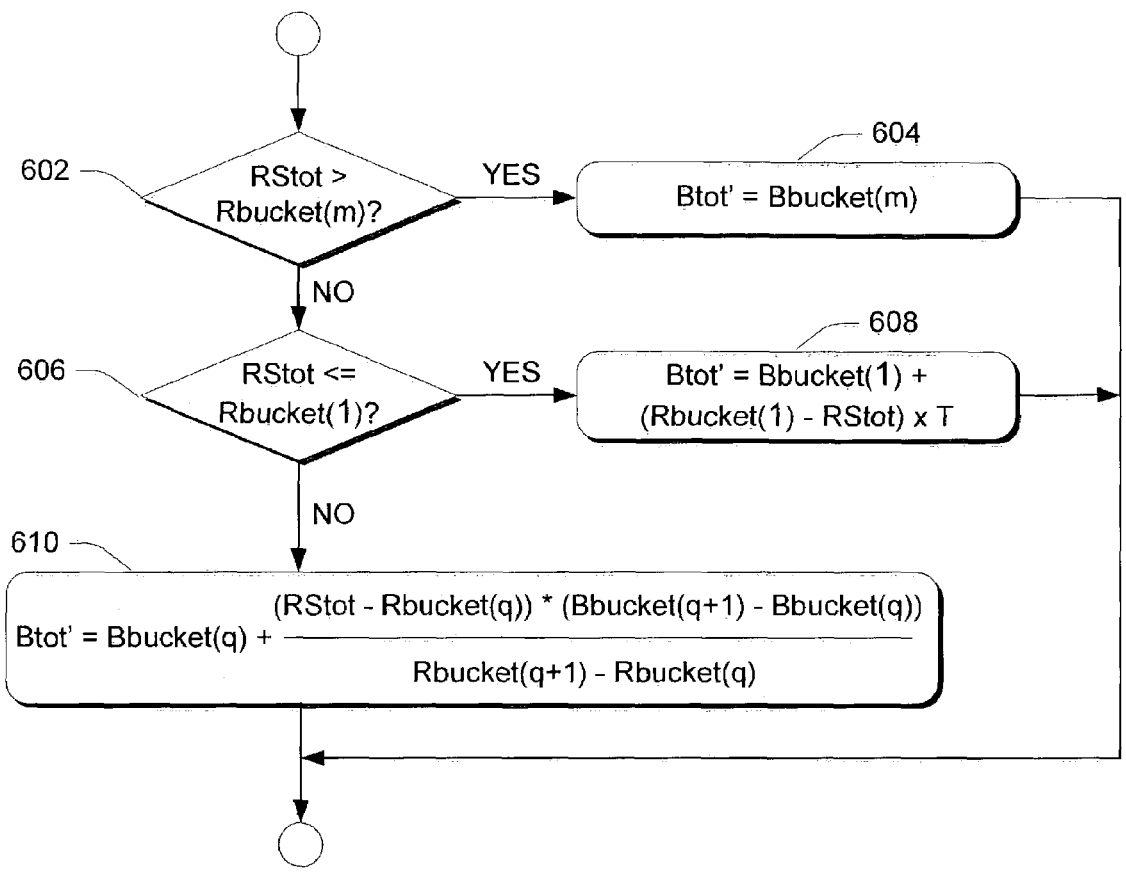
FIG. 6a is a flow diagram of a client methodological implementation described herein for calculating a buffer size.
Figure 6B:
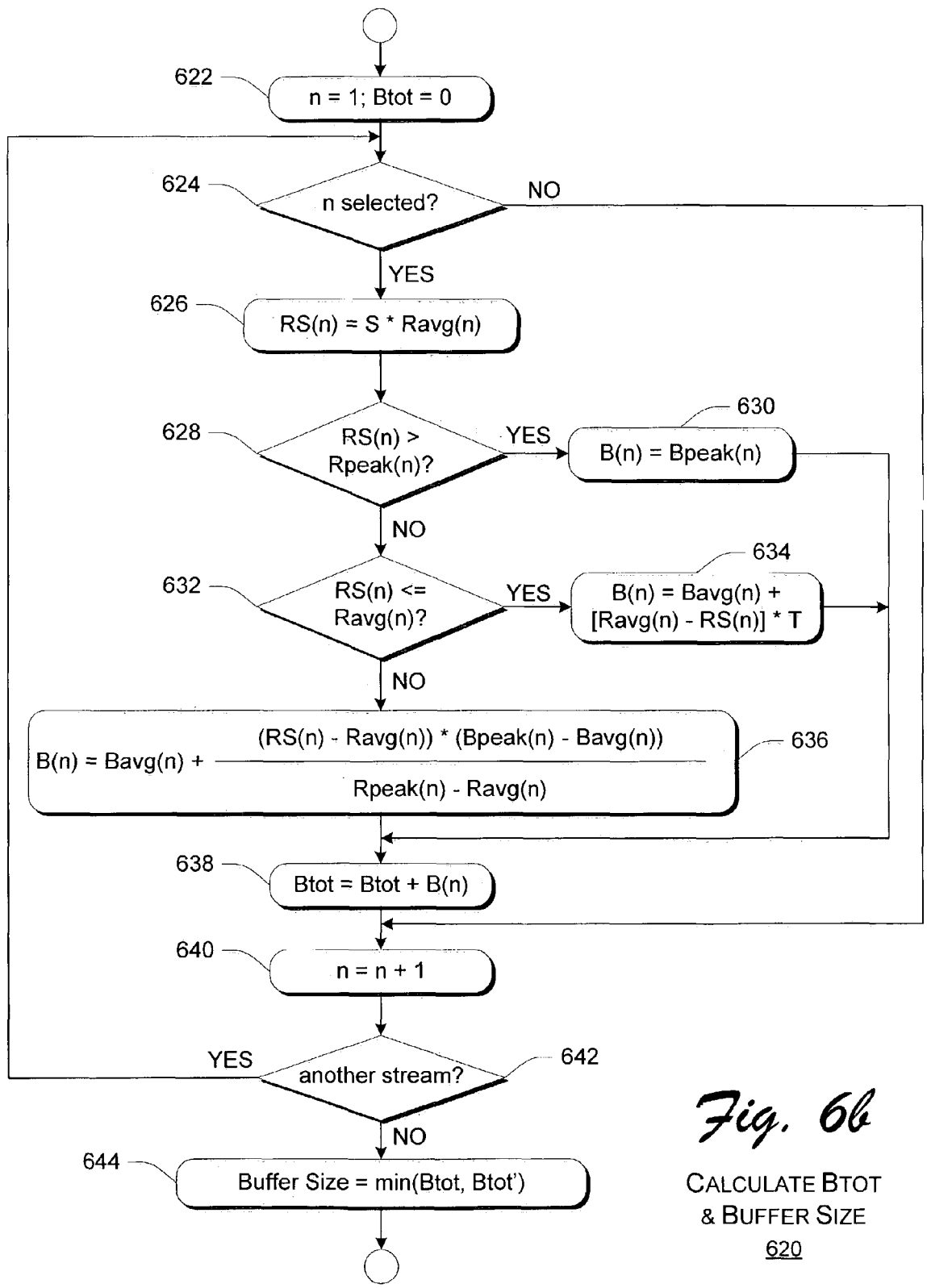
FIG. 6b is a flow diagram of a client methodological implementation described herein for calculating a buffer size.

FIGS. 6a and 6b are a flow diagrams 600, 620 that, together, depict a client methodological implementation of buffer size calculation as described above. The flow diagram 600 of FIG. 6a derives an intermediate buffer size, Btot', that is derived from the leaky bucket pairs of rates/buffer sizes selected earlier. The flow diagram 620 of FIG. 6b first derives an intermediate buffer size, Btot, that is derived from the selected streams, and then determines the better buffer size, Btot' or Btot.

In the following discussion, the following values are used:

R(n)=average bit rate of stream n
S=speed multiplier
RS(n)=streaming bit rate of R(n) (i.e. R(n)×S)
Rtot=total average bit rate of selected streams
RStot=Rtot×S (actual transmission bit rate)
B(n)=required buffering time for stream n streamed at rate RS(n)
T=playing time of content
m=number of "leaky buckets" in file containing all streams
Rbucket(x), Bbucket(x)=bit rate and size of leaky bucket x containing all streams, x=1 to m
q=integer in the range of [1, m−1], where q is the smallest index such that RStot lies in the interval between Rbucket(q) and Rbucket(q+1).

In the following discussion, the actions discussed are performed by the buffer calculation module 260 unless specified otherwise.

The flow diagram 600 depicted in FIG. 6a utilizes the leaky bucket values (fourteen (14) pairs in the present example, but any other practicable number in one or more other implementations) to calculate a buffer size. The buffer size calculated in FIG. 6a is referred to herein as Btot' and is, to some extent, an intermediate value that will be used in later calculations to determine a final buffer size.

At block 602, if RStot is greater than Rbucket(m) ("Yes" branch, block 602), then Btot' equals Bbucket(m). In other words, if RStot is larger than the rate of the leaky bucket having the highest rate, then the buffer size is set to the buffer size associated with the leaky bucket having the highest rate at block 604.

Otherwise ("No" branch, block 602), if RStot is less than or equal to Rbucket(1) ("Yes" branch, block 606), then Btot' is calculated to be Bbucket(1)+(Rbucket(1)−RStot)*T at block 608. If not ("No" branch, block 606), then Btot' is determined by interpolation at block 610.

The calculation of Btot' shown in block 610 is:

$$Btot'=Bbucket(q)+[(RStot-Rbucket(q))*(Bbucket(q+1)-Bbucket(q))]/[Rbucket(q+1)-Rbucket(q)]$$

At this point, the "intermediate" buffer size Btot' has been determined. Btot' is referred to as "intermediate" here only because it will be compared with another buffer size (Btot) derived below to determine the better buffer size to use. However, it is noted that Btot' is a buffer size that could be used in an of itself.

The flow diagram 620 depicted in FIG. 6b utilizes the pair of rate values and corresponding buffer values associated with the streams selected to be streamed. Similar to Btot', above, the buffer size calculated in FIG. 6b (Btot) is—to some extent—an intermediate value that is used at the end of the process of FIG. 6b to determine a final buffer size.

As shown in the flowchart 620, the buffer size calculation module 160 cycles through each stream in the file and performs certain calculations using streams that have been selected for streaming. It is noted that in at least one other implementation, another technique may be used that simply determines beforehand which streams have been selected for streaming and bases calculations on those streams. The implementation depicted by FIG. 6b is exemplary only.

At block 622, the variable n (representing a stream number associated with a stream in the file) is initialized to 1 and the value Btot is initialed to zero. If n is not associated with a stream that has been selected for streaming ("No" branch, block 624)1, then the process skips down to block 640, where n is incremented by 1. If n represents a selected stream ("Yes" branch, block 624), then RS(n) is set to the average streaming rate for stream n (Ravg(n) multiplied by the speed factor (S) at block 626.

If RS(n) is greater than the peak bit rate for the stream, i.e. Rpeak(n) ("Yes" branch, block 628), then B(n) is set to Bpeak (n) at block 630. If not ("No" branch, block 628), then if RS(n) is less than or equal to the average bit rate of the stream (Ravg(n)) ("Yes" branch, block 632), then B(n) equals Bavg (n)+(Ravg(n) −RS(n))*T(block 634). Otherwise ("No" branch, block 632), B(n) is derived using linear interpolation at block 636).

Block 636 derives B(n) as:

$$Bavg(n)+[(RS(n)-Bavg(n))*(Bpeak(n)-Bavg(n))]/[(Rpeak(n)-Ravg(n)].$$

The Btot value is updated at block 638 by adding the newly derived B(n). In other words, Btot keeps a running total of the sum of all B(n) as B(n) for each selected stream is derived.

The stream number, n, is incremented at block 640. If there is another stream in the file that hasn't been processed yet ("Yes" branch, block 642), then the process reverts to block 624 and repeats until all streams have been processed. After all the streams in the file have been processed ("No" branch, block 642), then the minimum of Btot and Btot' is determined at block 644, which provides the buffer size that will be used in the streaming process The content buffer 232 in the client 200 is set to that amount and the streaming process can begin.

Other Considerations

Although not specifically described above, some other considerations can be made when deriving an optimal buffer size to utilize in a streaming process. In the particular example shown above, a set of fourteen (14) leaky buckets for all streams in a file are used together with a set of (2) leaky buckets for each stream in the file. In principle, any other subset of streams could also have its own set of leaky buckets.

For example, if there are four streams in a file, in addition to the usual sets of leaky buckets for the subsets {1,2,3,4}, {1}, {2}, {3} {4}, there could be sets of leaky buckets for the subsets {1,2} and {3,4}—which would be of significant greater interest if streams 1 and 2 were likely to be selected together and if stream 3 and 4 were likely to be selected together.

Then, given any subset of streams—say {1,2,3}—the minimum sufficient buffer size could be computed as the minimum of the Btot values computed from not only {1,2,3, 4} and {1}+{2}+{3} but also {1,2}+{3}. The latter is likely to provide the tightest bound of the three.

Furthermore, it is noted that any of the available buffer size computations can be omitted. For example, the buffer size calculation (Btot') based on {1,2,3,4} does not have to be used. The buffer size computation (Btot) based on {1}+{2}+ {3} may be sufficient.

Exemplary Computing Environment

Figure 7:
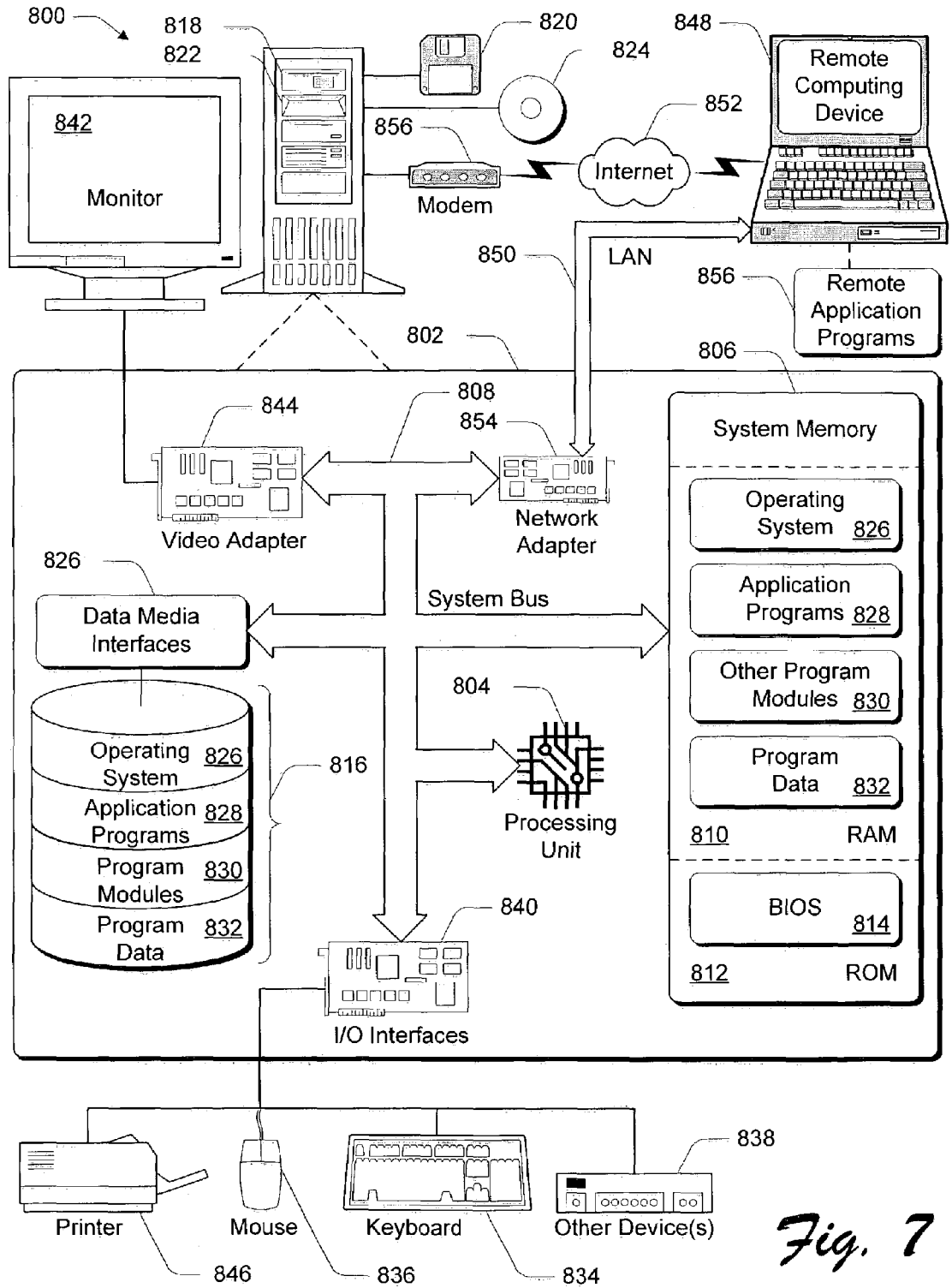
FIG. 7 is an example of a computing operating environment capable of implementing the server side and/or the client side of the systems and methods described herein.

The various components and functionality described herein are implemented with a computing system. FIG. 7 shows components of typical example of such a computing system, i.e. a computer, referred by to reference numeral 700. The components shown in FIG. 7 are only examples, and are not intended to suggest any limitation as to the scope of the functionality of the invention; the invention is not necessarily dependent on the features shown in FIG. 7.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 7, the components of computer 700 may include, but are not limited to, a processing unit 702, a system memory 704, and a system bus 706 that couples various system components including the system memory to the processing unit 702. The system bus 706 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (YESA) local bus, and Peripheral Component Interconnect (PCI) bus also known as the Mezzanine bus.

Computer 700 typically includes a variety of computer-readable media. Computer-readable media can be any available media that can be accessed by computer 700 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 700. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 704 includes computer storage media in the form of volatile and/or nonvolatile memory such as read only memory (ROM) 708 and random access memory (RAM) 710. A basic input/output system 712 (BIOS), containing the basic routines that help to transfer information between elements within computer 700, such as during start-up, is typically stored in ROM 708. RAM 710 typically contains data and/or program modules that are immediately accessible to and/or presently being operated on by processing unit 702. By way of example, and not limitation, FIG. 7 illustrates operating system 714, application programs 716, other program modules 718, and program data 720.

The computer 700 may also include other removable/non-removable, volatile/nonvolatile computer storage media. By way of example only, FIG. 7 illustrates a hard disk drive 722 that reads from or writes to non-removable, nonvolatile magnetic media, a magnetic disk drive 724 that reads from or writes to a removable, nonvolatile magnetic disk 726, and an optical disk drive 728 that reads from or writes to a removable, nonvolatile optical disk 730 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 722 is typically connected to the system bus 706 through a non-removable memory interface such as data media interface 732, and magnetic disk drive 724 and optical disk drive 728 are typically connected to the system bus 706 by a removable memory interface such as interface 734.

The drives and their associated computer storage media discussed above and illustrated in FIG. 7 provide storage of computer-readable instructions, data structures, program modules, and other data for computer 700. In FIG. 7, for example, hard disk drive 722 is illustrated as storing operating system 715, application programs 717, other program modules 719, and program data 721. Note that these components can either be the same as or different from operating system 714, application programs 716, other program modules 718, and program data 720. Operating system 715, application programs 717, other program modules 719, and program data 721 are given different numbers here to illustrate that, at a minimum, they are different copies. A user may enter commands and information into the computer 700 through input devices such as a keyboard 736 and pointing device 738, commonly referred to as a mouse, trackball, or touch pad. Other input devices (not shown) may include a microphone, joystick, game pad, satellite dish, scanner, or the like. These and other input devices are often connected to the processing unit 702 through an input/output (I/O) interface 740 that is coupled to the system bus, but may be connected by other interface and bus structures, such as a parallel port, game port, or a universal serial bus (USB). A monitor 742 or other type of display device is also connected to the system bus 706 via an interface, such as a video adapter 744. In addition to the monitor 742, computers may also include other peripheral output devices 746 (e.g., speakers) and one or more printers 748, which may be connected through the I/O interface 740.

The computer may operate in a networked environment using logical connections to one or more remote computers, such as a remote computing device 750. The remote computing device 750 may be a personal computer, a server, a router, a network PC, a peer device or other common network node, and typically includes many or all of the elements described above relative to computer 700. The logical connections depicted in FIG. 7 include a local area network (LAN) 752 and a wide area network (WAN) 754. Although the WAN 754 shown in FIG. 7 is the Internet, the WAN 754 may also include other networks. Such networking environments are commonplace in offices, enterprise-wide computer networks, intranets, and the like.

When used in a LAN networking environment, the computer 700 is connected to the LAN 752 through a network interface or adapter 756. When used in a WAN networking environment, the computer 700 typically includes a modem 758 or other means for establishing communications over the Internet 754. The modem 758, which may be internal or external, may be connected to the system bus 706 via the I/O interface 740, or other appropriate mechanism. In a networked environment, program modules depicted relative to the computer 700, or portions thereof, may be stored in the remote computing device 750. By way of example, and not limitation, FIG. 7 illustrates remote application programs 760 as residing on remote computing device 750. It will be appreciated that the network connections shown are exemplary and other means of establishing a communications link between the computers may be used.

Computer-Executable Instructions

An implementation of the exemplary systems and methods for improved streaming of variable bit rate multimedia content may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Conclusion

Although the subject matter has been described in language specific to structural features and/or methods, it is to be understood that the invention defined by the appended claims is not necessarily limited to the specific features or methods described herein. Rather, the specific features and methods are disclosed as exemplary forms of implementing the claimed systems and methods.

The invention claimed is:

1. A method, comprising:
    encoding multimedia data for processing, said multimedia data including at least one data stream;
    storing the encoded multimedia data in a data file for streaming to one or more clients;

selecting at least two possible bit rate values at which the data file may be streamed;

calculating a client buffer size value for each possible bit rate value, each client buffer size value being a client buffer size for the possible bit rate value corresponding to the client buffer size value;

for each data stream, calculating an average bit rate value, a peak bit rate value, an average buffer size value corresponding to the average bit rate value and a peak buffer size value corresponding to the peak bit rate value;

storing the bit rate values and the buffer size values in the data file; and wherein the bit rate values and the buffer size values can be used to determine an optimal client buffer size for a client receiving the multimedia data at a particular constant bit rate.

2. The method as recited in claim 1, wherein the one or more data streams further comprise at least one audio stream and one video stream.

3. The method as recited in claim 1, further comprising setting a variable bit rate flag in the data file if the encoded multimedia data in the data file contains variable bit rate data.

4. The method as recited in claim 1, wherein the average bit rate value, the peak bit rate value, the average buffer size value and the peak buffer size value are approximations.

5. The method as recited in claim 1, wherein the data file is an Advance System Format (ASF) file.

6. The method as recited in claim 1, wherein the calculating the bit rate values and the buffer size values further comprises using a leaky bucket method to calculate the bit rate values and the buffer size values.

7. The method as recited in claim 1, further comprising transmitting at least a portion of the data file to a client.

8. The method as recited in claim 7, wherein the transmitting at least a portion of the data file further comprises transmitting at least a portion of the data file that includes the buffer size values and the bit rate values.

9. A system, comprising:

one or more processors;

a compression module comprising computer-executable instructions encoded on one or more computer-readable storage media that when executed on the one or more processors, compress multimedia data for streaming to one or more clients by encoding the multimedia data into a streaming format and storing the encoded multimedia data in a data file;

a buffer size calculation module comprising computer-executable instructions encoded on one or more computer-readable storage e media that when executed on the one or more processors:

select one or more possible bit rates at which the data file may be streamed to the one or more clients and to calculate a client buffer size corresponding to each possible bit rate, calculate for each of the one or more streams included in the data file a first buffers size value and a second buffer size value that correspond, respectively, to a first bit rate value and a second bit rate value associated with the stream;

store the bit rate values and the corresponding buffer size values in the data file; and wherein the one or more clients can utilize the bit rate values and the buffer size values to calculate an optimal client buffer size for receiving the data file at a particular bit rate.

10. The system as recited in claim 9, wherein the one or more streams further comprise at least one audio stream and at least one video stream.

11. The system as recited in claim 9, further comprising a variable bit rate module comprising computer-executable instructions encoded on one or more computer-readable storage media that, when executed on the one or more processors set a variable bit rate flag in the data file if the data file contains variable bit rate data.

12. The system as recited in claim 9, wherein the data file is an Advance System Format file.

13. The system as recited in claim 9, wherein the buffer size calculation module is configured to calculate the bit rate values and the buffer values using a leaky bucket interpolation method.

14. The system as recited in claim 9, further comprising a content buffer comprising computer-executable instructions encoded on one or more computer-readable storage media that, when executed on the one or more processors, store a portion of the data file as a previously stored portion of the data file is streamed to the one or more clients.

15. One or more computer-readable storage media containing computer-executable instructions that, when executed on a computer, perform the following steps:

selecting one or more possible bit rate values that each denote a bit rate at which a multimedia data file can be streamed to at least a client;

calculating a client buffer size for each possible bit rate value;

determining a first buffer size for a first bit rate associated with each of one or more streams in the multimedia data file;

determining a second buffer size for a second bit rate associated with each of one or more streams in the multimedia data file;

storing the buffer values and the bit rate values in a location associated with the multimedia data file; and wherein the bit rate values and the buffer vales can be used by a client to determine an optimal streaming rate at which to receive the multimedia data file, and to calculate an optimal buffer size associated with the streaming bit rate.

16. The one or more computer-readable storage media recited in claim 15, further comprising computer executable instructions that, when executed on a computer, perform the step of creating the multimedia data file by encoding multimedia data.

17. The one or more computer-readable storage media recited in claim 15, wherein the first bit rate is less than the second bit rate.

18. The one or more computer-readable storage media recited in claim 15, wherein the first bit rate is an approximate average bit rate and the second bit rate is an approximate peak bit rate.

19. The one or more computer-readable storage media recited in claim 15, wherein the multimedia data file includes at least one audio stream and at least one video stream.

20. The one or more computer-readable storage media recited in claim 15, further comprising computer executable instructions that, when executed on a computer, perform the step of providing an indication in the multimedia data file that the multimedia data file contains a variable bit rate data if the multimedia data file contains variable bit rate data.

21. The one or more computer-readable storage media recited in claim 15, wherein the multimedia data file further comprises a file in ASF format.

22. The one or more computer-readable storage media recited in claim 15, wherein the determination steps are accomplished using a leaky bucket method.

23. The one or more computer-readable storage media recited in claim 15, further comprising computer executable instructions that, when executed on a computer, perform the step of streaming client-selected streams of the multimedia data file to the client.

* * * * *